United States Patent
Garlapati et al.

(10) Patent No.: US 8,166,222 B2
(45) Date of Patent: Apr. 24, 2012

(54) USB TRANSCEIVER CIRCUITRY INCLUDING 5 VOLT TOLERANCE PROTECTION

(75) Inventors: Akhil Garlapati, Woburn, MA (US); Bruce Philip Del Signore, Hollis, NH (US)

(73) Assignee: Silicon Laboratories Inc., Austin, TX (US)

(*) Notice: Subject to any disclaimer, the term of this patent is extended or adjusted under 35 U.S.C. 154(b) by 107 days.

(21) Appl. No.: 12/059,998

(22) Filed: Mar. 31, 2008

(65) Prior Publication Data

US 2009/0248930 A1 Oct. 1, 2009

(51) Int. Cl.
*G06F 13/00* (2006.01)
*H03K 19/0175* (2006.01)
*H02H 3/00* (2006.01)

(52) U.S. Cl. .............. 710/106; 326/62; 361/88
(58) Field of Classification Search .......... 710/104–106; 361/86, 88; 326/83, 62
See application file for complete search history.

(56) References Cited

U.S. PATENT DOCUMENTS

| | | | | |
|---|---|---|---|---|
| 5,570,043 A | * | 10/1996 | Churchill | 326/81 |
| 5,654,858 A | * | 8/1997 | Martin et al. | 361/56 |
| 6,904,373 B2 | * | 6/2005 | Le et al. | 702/60 |
| 6,946,904 B1 | * | 9/2005 | Varma et al. | 327/595 |
| 7,268,592 B2 | * | 9/2007 | Tanishima | 327/77 |
| 7,619,864 B1 | * | 11/2009 | Huang | 361/88 |
| 2005/0078427 A1 | * | 4/2005 | Castro | 361/119 |
| 2006/0149870 A1 | * | 7/2006 | Sears et al. | 710/71 |
| 2007/0279096 A1 | * | 12/2007 | Chong et al. | 326/83 |
| 2009/0109587 A1 | * | 4/2009 | Smith et al. | 361/86 |

* cited by examiner

*Primary Examiner* — Mark Rinehart
*Assistant Examiner* — Trisha Vu
(74) *Attorney, Agent, or Firm* — Cesari & Reed, LLP; R. Michael Reed

(57) ABSTRACT

An integrated circuit includes USB communication circuitry for communicating via a USB interface. The USB transceiver circuitry transmits data to and from the integrated circuit over the USB interface. The USB transceiver circuitry further provides protection to internal circuitry of the integrated circuit from a 5 volt short circuit on the USB interface.

17 Claims, 14 Drawing Sheets

USB TRANSCEIVER CIRCUITRY INCLUDING 5 VOLT TOLERANCE PROTECTION

TECHNICAL FIELD

The present invention relates to short circuit protection devices, and more particularly, to USB transceiver circuitry having 5 volt short circuit protection incorporated therein.

BACKGROUND

For USB transceiver circuitries, it is necessary for the interface D+ and D− pins to be able to withstand a 5 volt short circuit. Presently, according to the USB 2.0 specification, a USB transceiver is required to withstand a continuous short circuit of D+ and/or D− to VBUS, ground, other data lines or the cable shield at the connector for a minimum of twenty-four hours without causing damage to the internal circuitry. Further improving these capabilities such that the D+ and D− pins could withstand shortage to a 5 volt source without damaging internal circuitry of the USB transceiver would also provide a great benefit to integrated circuit devices including a USB interface. Within 0.3 micron and older CMOS technologies, these circuitries are already 5 volt tolerant and thus there is no need to provide the 5 volt protections that are necessary in the fine line CMOS circuitries. Within fine line CMOS processes, the transistor breakdown voltage is less than 5 volts. Thus, within the fine line technologies, there is a need to provide protection to the transistors within the circuitries since they are required to operate in a 5 volt environment. Thus, there is a need for an improved USB transceiver design enabling the pins of the USB interface to withstand a short circuit to a 5 volt source over an extended period of time.

SUMMARY

The present invention, as disclosed and described herein, comprises, in one aspect thereof, an integrated circuit including USB communication circuitry. The USB communication circuitry includes a USB interface for interconnecting the integrated circuit and an external USB device. USB transceiver circuitry transmits data to/from the integrated circuit over the USB interface. The USB interface provides protection to internal circuitry from a 5 volt short circuit on the USB interface. A USB controller controls operations of the USB transceiver circuitry.

BRIEF DESCRIPTION OF THE DRAWINGS

For a more complete understanding, reference is now made to the following description taken in conjunction with the accompanying Drawings in which.

DETAILED DESCRIPTION

Figure 1:
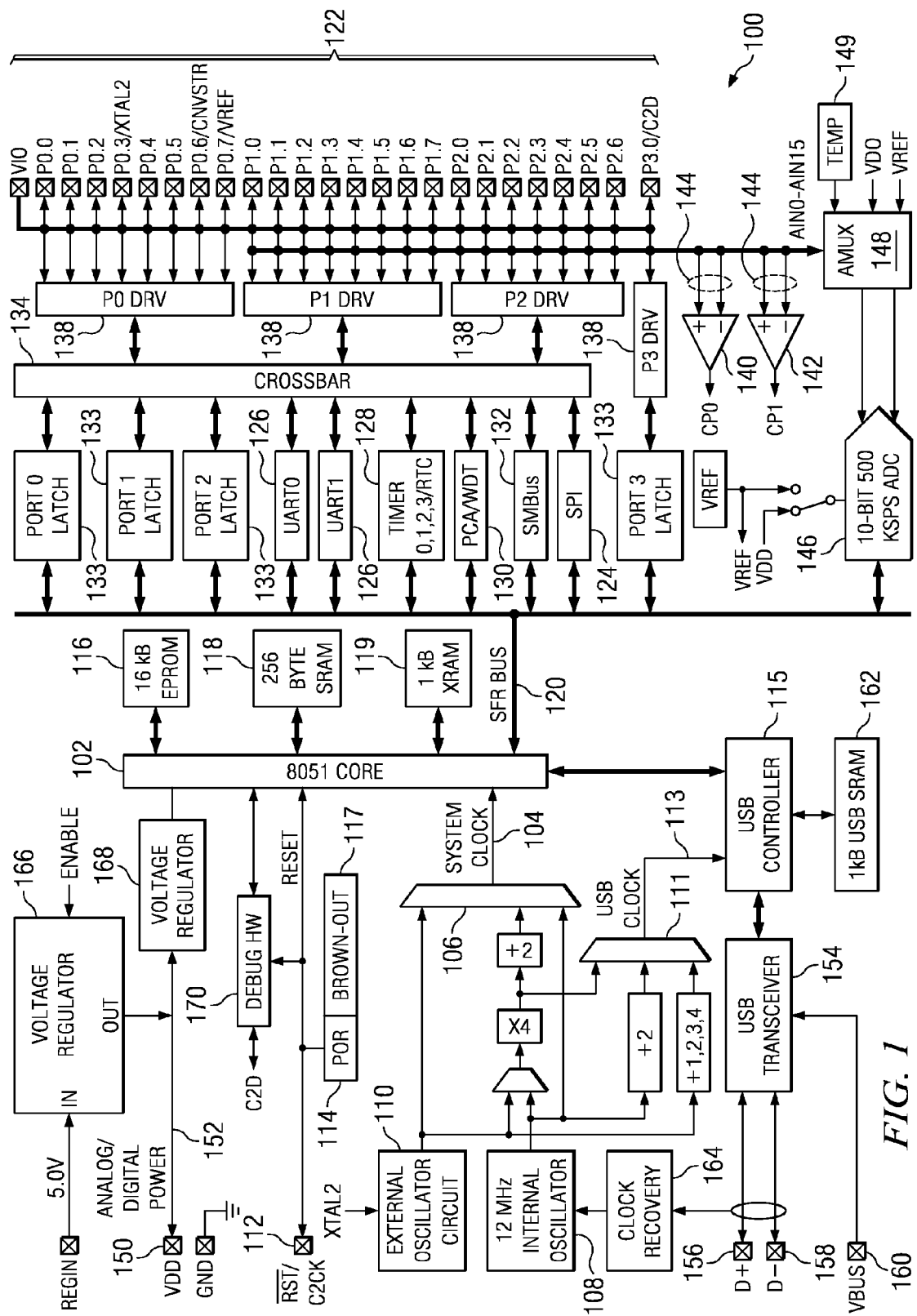
FIG. 1 is a block diagram of a microcontroller unit incorporating the protection circuitry of the present disclosure.

Referring now to the drawings, wherein like reference numbers are used herein to designate like elements throughout, the various views and embodiments of a USB transceiver circuitry including 5 volt tolerance protection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a block diagram of a microcontroller unit (MCU) 100. The MCU 100 is generally of the type similar to family of part numbers C8051T620 manufactured by Silicon Laboratories, which are generally referred to as "8051 mixed signal controllers." The MCU 100 includes a processing core 102 which is typically composed of a conventional 8-bit microprocessor of the type "8051." The processing core 102 receives a clock signal on line 104 from a multiplexer 106. The multiplexer 106 is operable to select among multiple clocks. There is provided a 12 MHz trimmable internal precision oscillator 108 or an external crystal controlled oscillator circuit 110. The precision internal oscillator 108 is described in U.S. Patent Application Publication No. 2004/0054835, entitled "PRECISION OSCILLATOR FOR AN ASYNCHRONOUS TRANSMISSION SYSTEM," filed Sep. 16, 2002, which is incorporated herein by reference in its entirety. The external oscillator circuit 110 and internal oscillator 108 are also connected to a second multiplexer 111 which provides a USB clock signal via line 113 to a USB controller 115.

The processing core 102 is also operable to receive an external reset on test terminal 112 or is operable to receive the reset signal from a power on reset block 114 connected with associated brownout circuitry 117. The external reset on test terminal 112 and power on reset block 114 also provide a reset to the processing core 102. The processing core 102 has associated therewith a plurality of memory resources, those being a 16 kB EPROM memory 116, a 256 kB SRAM memory 118 and a 1 kB XRAM memory 119.

The processing core 102 interfaces with various digital and analog peripherals via an SFR Bus 120. The SFR Bus 120 is a special function register bus that allows the processing core 102 to interface with various operating pins 122 that can interface external to the chip to receive digital values, output digital values, receive analog values or output analog values. Various digital I/O peripherals are provided, these being first and second UARTs 126, timers 128, PCA/WDT 130, SMBus interface circuit 132 and a serial peripheral interface 124. The SFR Bus 120 also communicates with a number of port latches 133. All of this circuitry 124-133 is interfaceable to the output pins 122 through a crossbar decoder 134 which is operable to configurably interface these devices with select ones of the outputs responsive to control signals from the processing core 102. The pins 122 may be in an analog or digital configuration. Port drivers 138 are used for driving the signals received from the priority crossbar decoder 134 to the output pins 132. The crossbar decoder 134 is described in U.S. Pat. No. 6,839,795, which is incorporated herein by reference.

The digital input/outputs to/from the digital peripherals are also interfaced to analog peripheral devices. The analog peripheral devices include a pair of analog comparators 140 and 142 for comparing two signals received on input lines 144 associated with each of the comparators. An analog-to-digital converter 146 receives analog input signals from an analog multiplexer 148 interfaced to a plurality of the input pins on the MCU 100. The analog multiplexer 148 allows the multiple outputs to be sensed through the pins 122 such that the ADC 146 can be interfaced to various sensors such as a temperature sensor 149. System power $V_{DD}$ is applied through pad 150. Power may be applied to the pad 150 via, for example, a battery. The power net 152 applies power to both the analog and digital peripheral devices to power the MCU.

The MCU 100 additionally includes USB communications capabilities via a USB transceiver 154. The USB transceiver 154 enables USB communications over a D+ input 156 and a D− input 158 according to the USB communications protocol. The USB transceiver 154 also receives and sends signals via the VBUS pin 160. The USB transceiver 154 is USB 2.0 compliant and includes on-chip matching and pull up resistors. The pull up resistors can be enabled/disabled in software and will appear on the D+ or D− pin according to the software selected speed setting (full or low speed). The USB transceiver 164 is controlled via the USB controller 115. The universal serial bus controller 115 is a USB 2.0 compliant full or low speed function. A total of 8 end point pipes are available including a bidirectional control end point and three pairs of in/out end point pipes. A 1 kB block of SRAM 162 is used for USB FIFO space. This FIFO space is distributed among the endpoints. The maximum FIFO size is 512 bytes. The USB connection can be operated as a full or low speed function. On-chip clock recovery circuitry 164 allows both full and low speed options to be implemented with the on-chip precision oscillator 108 as the USB clock source. An external oscillator source 110 can also be used to generate the USB clock signal which is selected via the multiplexer 111. The CPU clock source is independent of the USB clock source.

The MCU 100 includes two internal voltage regulators 166 and 168. One regulator 166 regulates a voltage source on the REGIN pin to 3.3 volts and the other regulator 168 regulates the internal core supply to 1.8 volts from a $V_{DD}$ power supply of 1.8 to 3.6 volts.

On-chip debug circuitry 170 provides non-intrusive, full speed in circuit debugging of the MCU 100. The circuitry supports inspection and modification of memory and registers, break points, and single stepping. No additional target RAM, program memory, timers or communication channels are required.

Figure 2:
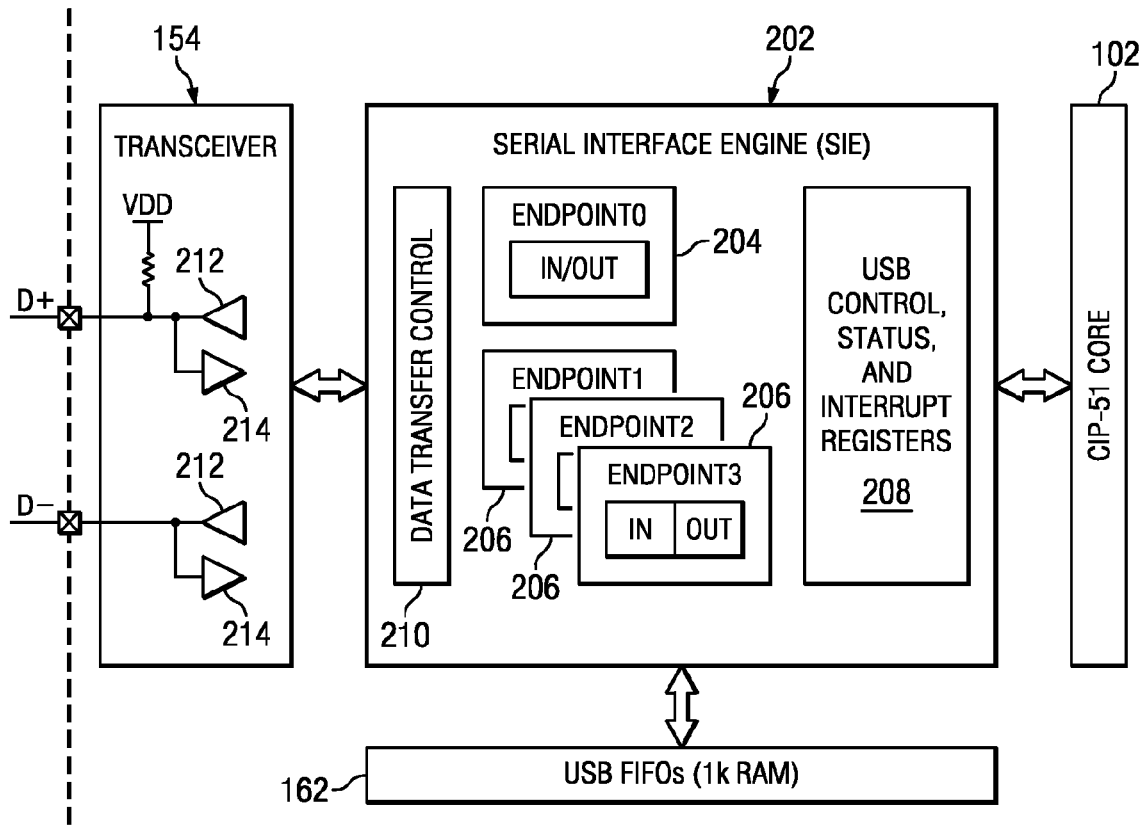
FIG. 2 is a functional block diagram of the universal serial bus communication circuitry.

Referring now to FIG. 2, there is more fully illustrated the components for providing USB communications. The universal serial bus circuitry includes the transceiver circuitry 154, the USB function controller comprising a serial interface engine 202 which interconnects with the transceiver 154 and the processing core 102. The serial interface engine (SIE) 202 interconnects with the USB FIFO memory comprised of a 1 k RAM 162. The transceiver circuitry 154 includes driver circuits 212 connected to each of the D+ and D− pins and receive buffers 214 also connected to each of the D+ and D− pins. The serial interface engine 202 performs all low level USB protocol tasks, interrupting the processor 102 when data has successfully been transmitted or received. When receiving data, the SIE 202 interrupts the processor when a complete data packet has been received and appropriate handshaking signals are automatically generated by the SIE 202. When transmitting data, the SIE 202 will interrupt the processor 102 when a complete data packet has been transmitted, and the appropriate handshake signal has been received. The SIE 202 will not interrupt the processor 102 when corrupted/erroneous packets are received. A bidirectional end point pipe 204 enables data transmissions in both directions and three pairs of in/out end point pipes 206 enable further data transmissions. Operation of the serial interface engine 202 is controlled via a number of USB control status and interrupt registers 208. Information is passed on to the transceiver circuitry 154 via the data transfer control 210.

Figure 3A:
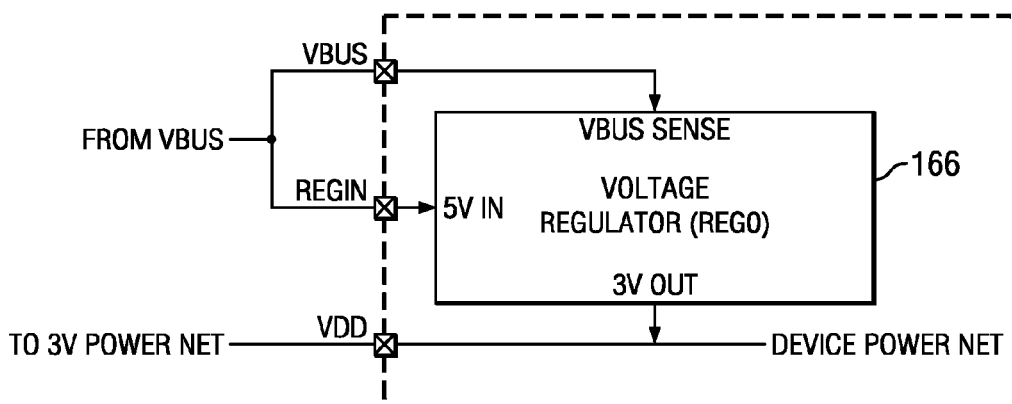
FIG. 3a-3d illustrate various configurations of the voltage regulator of the MCU.
Figure 3B:
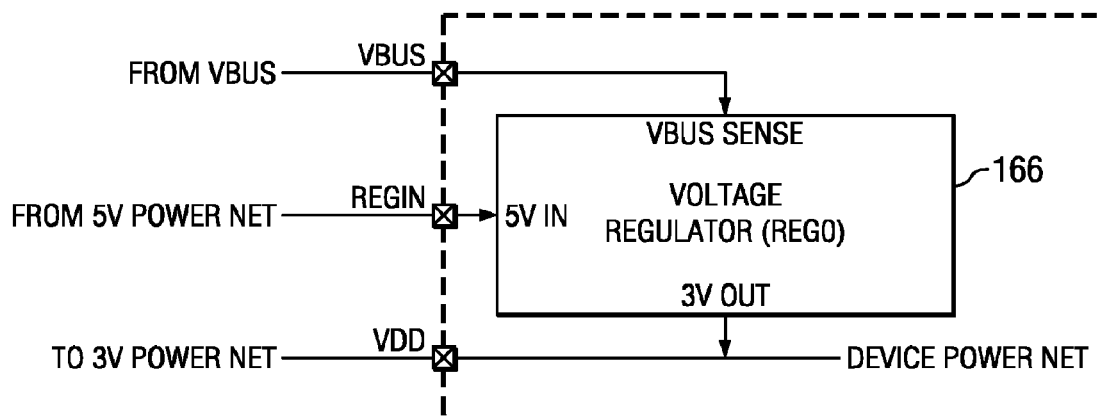
Figure 3C:
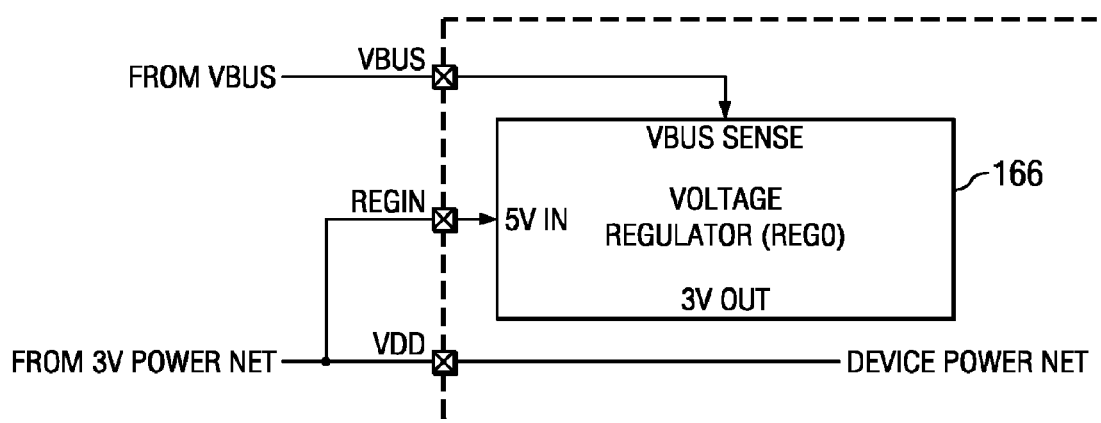
Figure 3D:
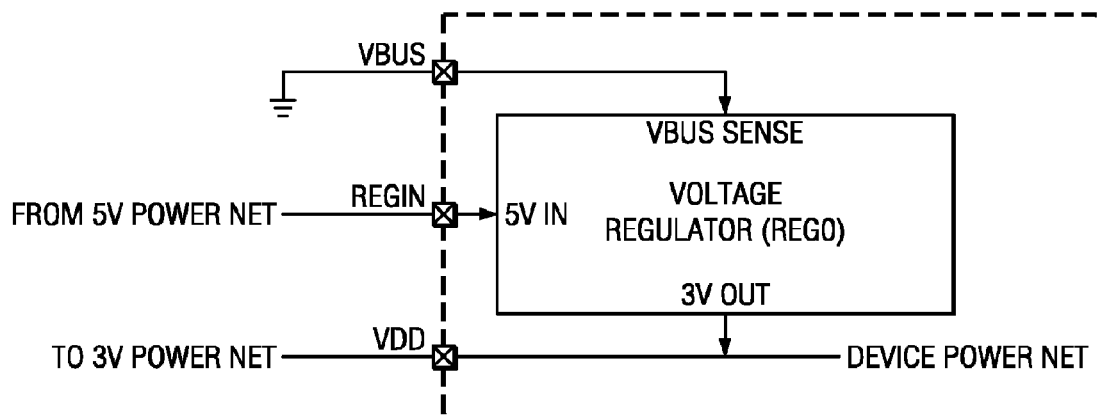

As described previously, the MCU 100 includes a voltage regulator 166 which may be connected to an external source. This regulator may be interconnected to external sources in a number of configurations as illustrated in FIGS. 3a-3d. As can be seen in FIGS. 3a-3d, the voltage regulator 166 may be interconnected in a number of manners. The VBUS pin and REGIN pin may be connected to the VBUS line 160 from the USB transceiver 154, and the $V_{DD}$ pin can be connected with a three volt power net. This is the configuration of the voltage regulator 166 when the device is USB bus powered. When the device is USB self powered, the voltage regulator 166 is connected as illustrated in FIG. 3b. In this configuration, the VBUS pin is connected to VBUS and the REGIN pin is connected to a 5 volt power net. The $V_{DD}$ pin is again connected to a 3 volt power net. FIG. 3c illustrates the USB self powered configuration wherein the voltage regulator 166 is disabled. The VBUS pin is connected to VBUS and the REGIN and $V_{DD}$ pins are connected with a 3 volt power net. Finally, in the no USB configuration, the VBUS pin is connected to ground and the REGIN pin is connected to a 5 volt power net while the $V_{DD}$ pin is connected to a 3 volt power net. In connecting the voltage regulator 166 according to any of these configurations, the possibility exists for the regulator 166 to be short circuited if the REGIN is inadvertently connected to ground. As will be discussed herein below, the configuration of the voltage regulator 166 may be established in such a manner to prevent the voltage regulator circuitry 166 and additional circuitry from being damaged if the MCU pins are incorrectly connected.

When configuring the voltage regulator or other circuitry, the chance of inadvertently connecting a pin to a 5 volt power net exists. Internal circuitry may be damaged when the input pins of the MCU 100 are inadvertently shorted to a 5 volt source that can cause damage to the internal circuitry within the MCU 100 that is equipped for operating according to a 3 volt internal supply rather than that at the 5 volt level. Thus, there is a need to protect the internal circuitry from inadvertent 5 volt shorts. One particular pair of pins that need to be protected are the D+ and D− pins of the USB connection. If a 5 volt signal is inadvertently shorted to one of these D+ or D− pins, the circuitry of the USB transceiver 154 may be damaged.

Figure 4:
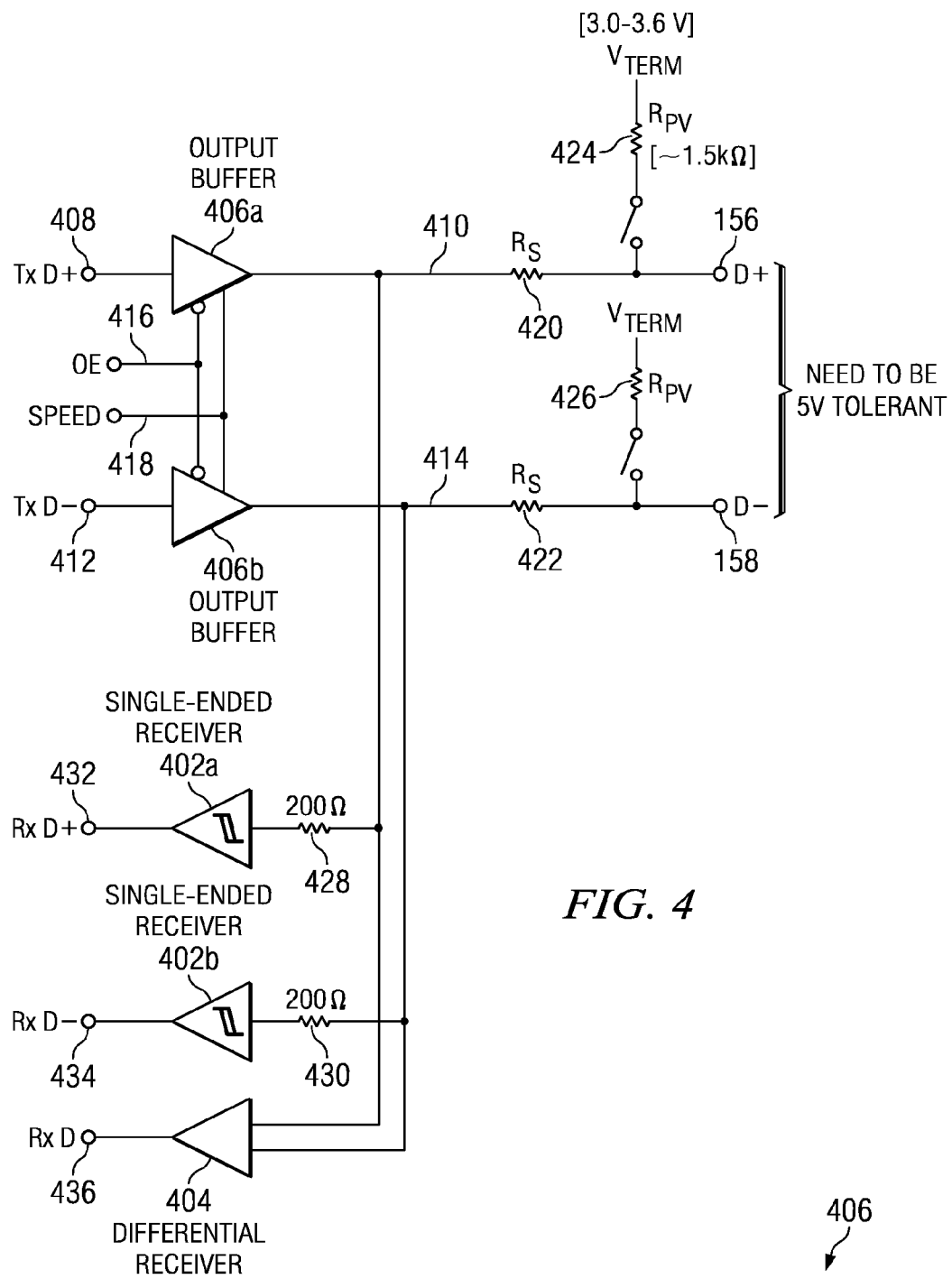
FIG. 4 is a block diagram of the universal serial bus transceiver circuitry.

As described previously with respect to FIG. 2, the USB transceiver 154 includes both output drivers 212 and receiver buffers 214. Referring now to FIG. 4, there is more particularly illustrated a block diagram of the USB transceiver circuitry 154. The transceiver circuitry 154 contains two single ended receivers 402, one differential receiver 404 and two full/low speed differential drivers 406. The drivers and receivers are connected to each of the output pins 156 (D+) and 158 (D−) of the USB interface connection. The output pads 156 and 158 need to be 5 volt tolerant to prevent damages to the circuitry of the USB transceiver if a 5 volt signal is inadvertently connected to one of pins 156 or 158.

A first differential driver 406a is connected between node 408 and node 410. The output of the transceiver 406a is connected with node 410, and the input is connected to node 408. Output driver 406b is connected on the TX D− line having its input connected to node 412 and its output connected to node 414. Control line 416 additionally provides control input OE to each of the transceivers 406, and a control line 418 provides a speed control signal to each of transceivers 406. A resistor 420 is connected between node 410 and the D+ output pad 156. A resistor 422 is connected between node 414 and the output pad 158 of the D− output. A pull up resistor 424 is connected to the D+ pad 156, and a pull up resistor 426 is connected to the D− pad 158. The input of a first single ended transistor 402a is connected to node 410 through a resistor 428. The output of the single ended receiver 402a is connected to the RX D+ line at node 432. The single ended receiver 402a is connected to node 410 through a resistor 428. The single ended receiver 402b is connected to node 414 through a resistor 430. The output of the single ended receiver 402b is connected to the RX D− line at node 434. The differential receiver 404 has its output connected to the RX D line at node 436. One input of the differential receiver 404 is connected to node 410 and the other input is connected to node 414.

Figure 5:
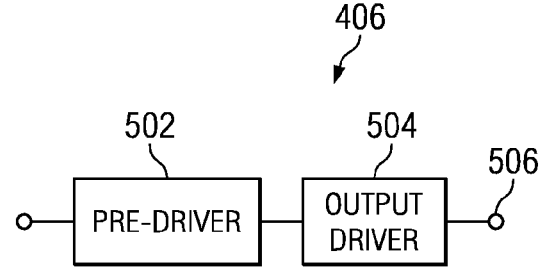
FIG. 5 is a block diagram of the driver circuitry of the USB transceiver.
Figure 6A:
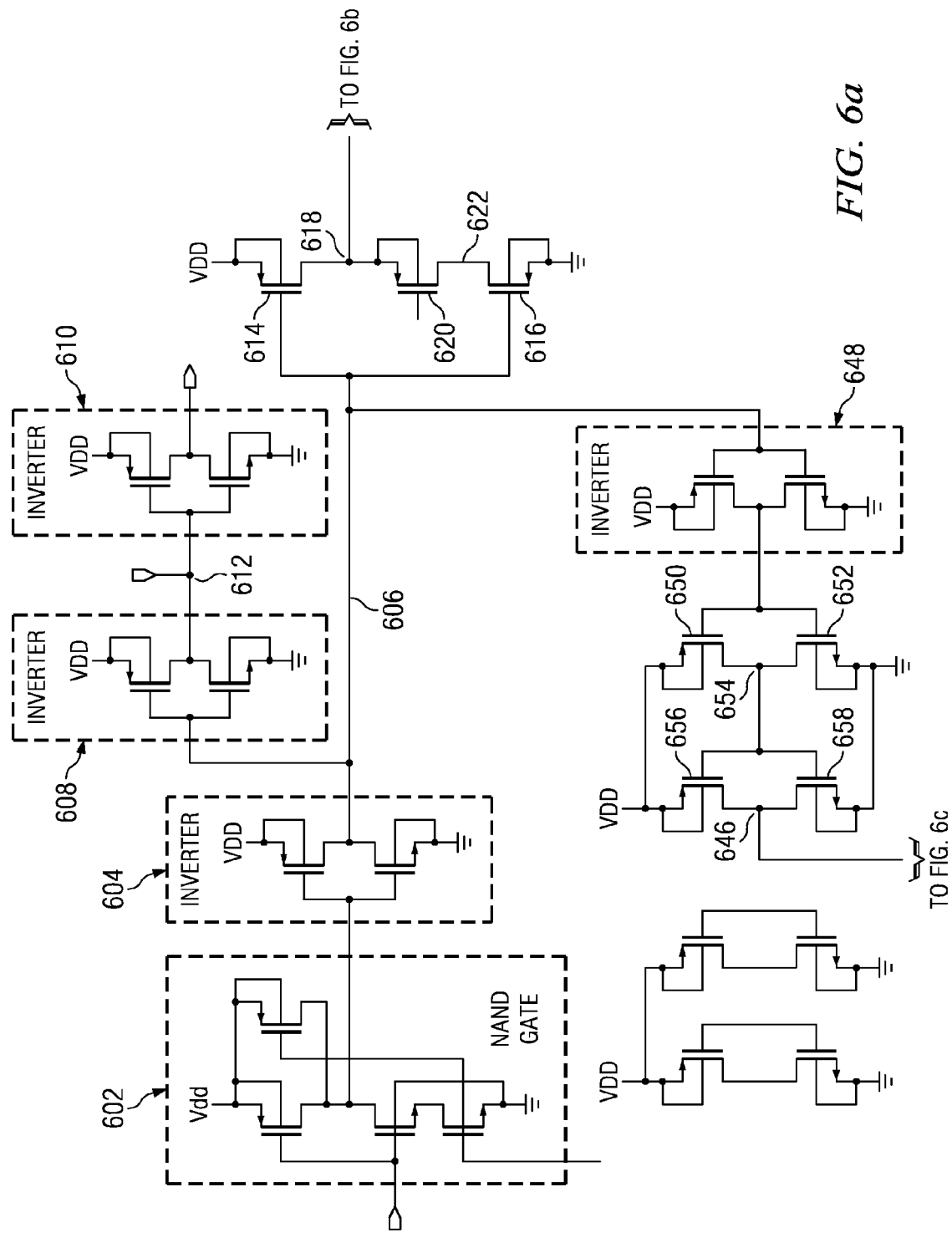
FIGS. 6a-6d are schematic diagrams of the pre-driver circuitry for the universal serial bus driver.
Figure 6B:
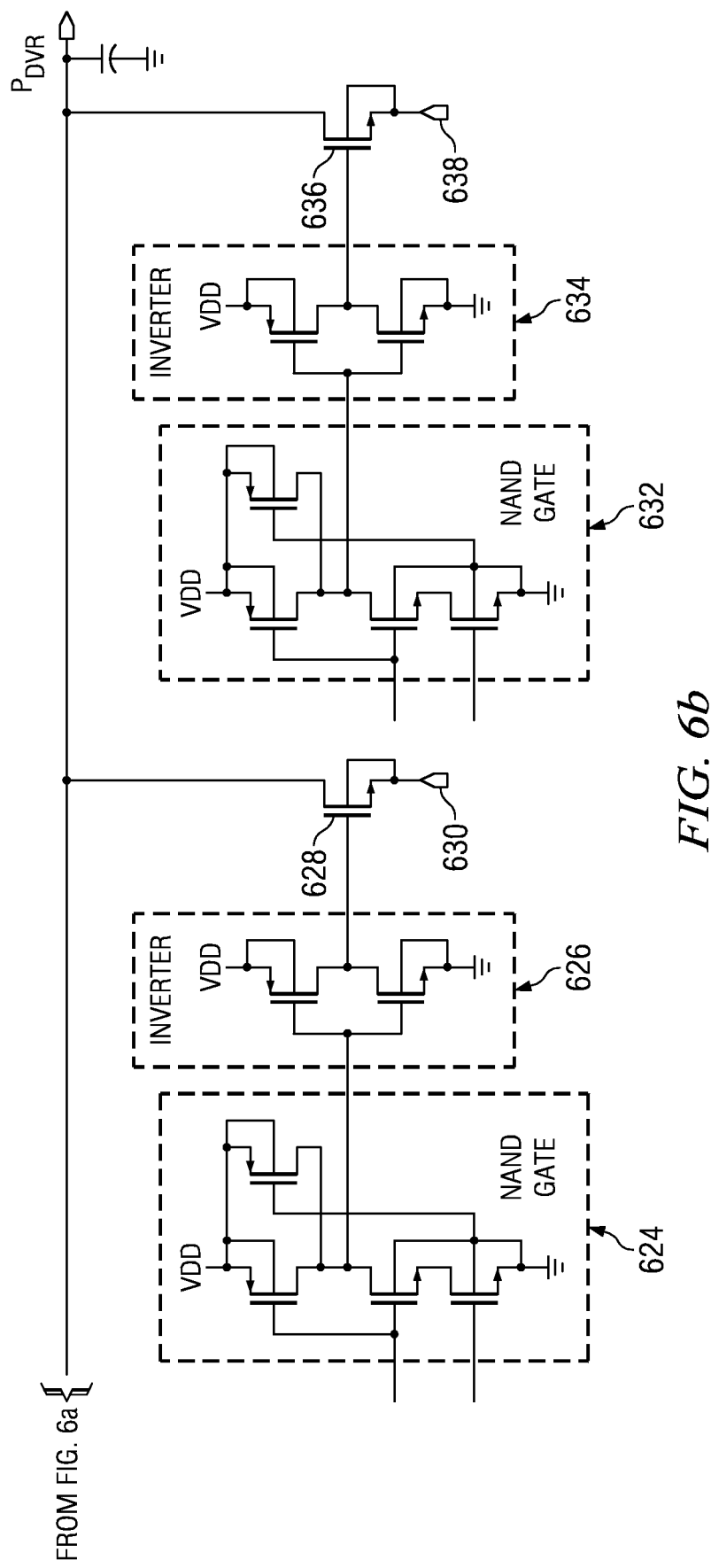
Figure 6C:
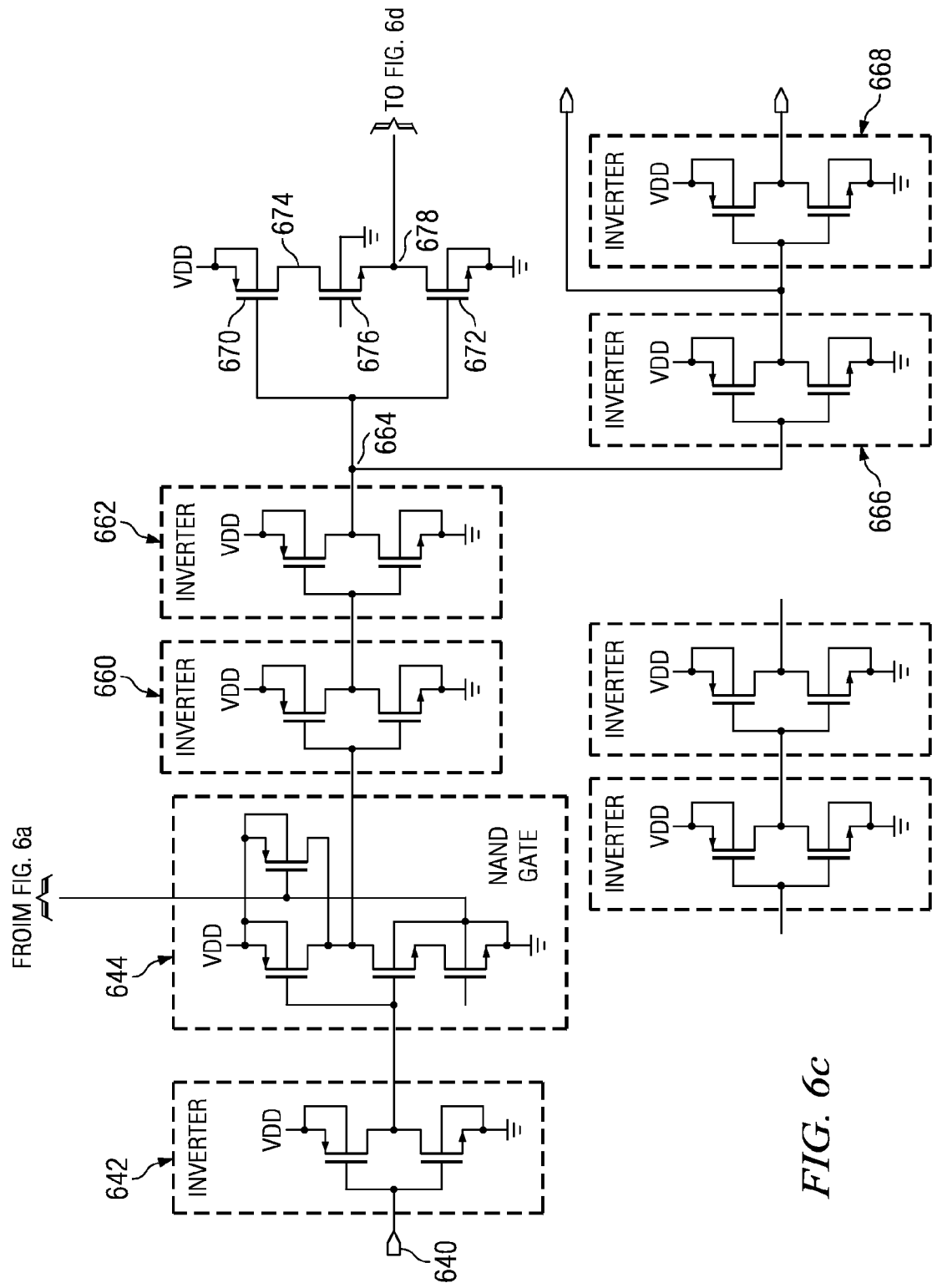
Figure 6D:
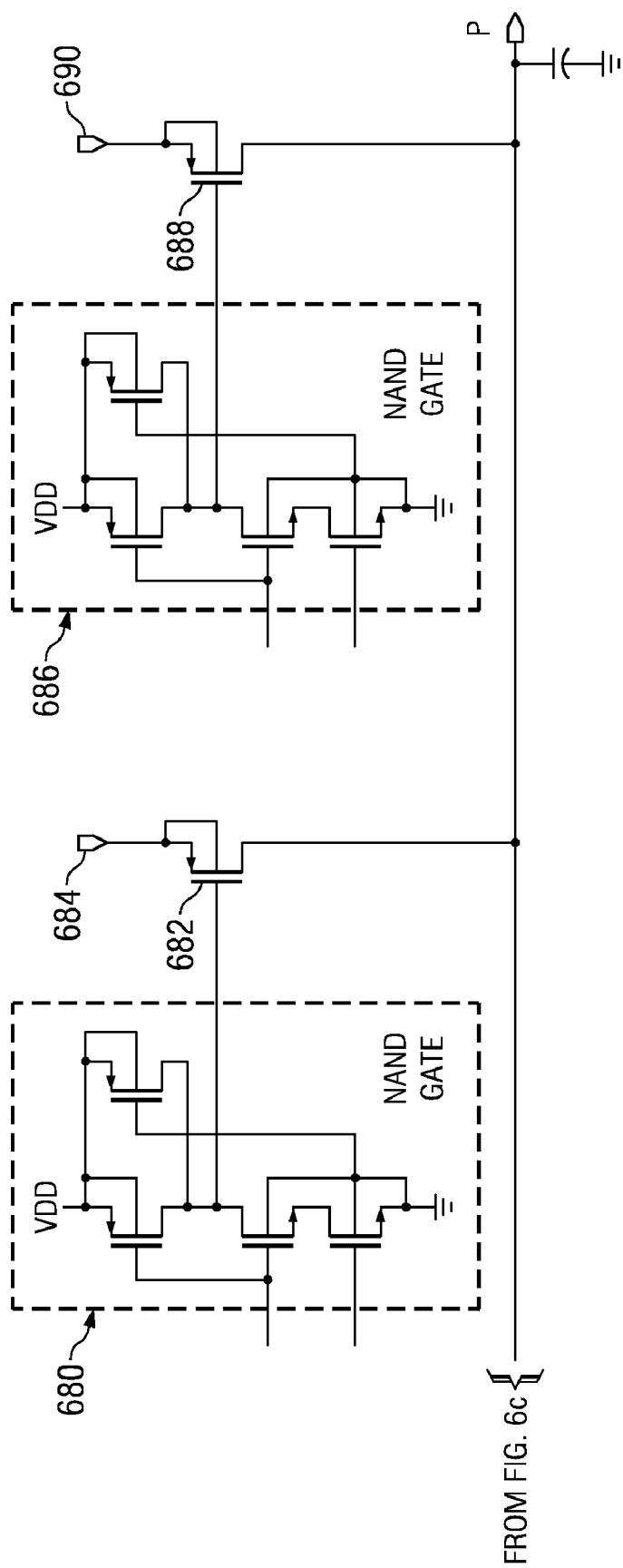

The 5 volt tolerant circuitry of the present disclosure for the D+ and D− inputs of the USB connection are implemented within the differential drivers 406 of the USB transceiver. Referring now to FIG. 5, there is illustrated a general block diagram of the differential drivers according to the present disclosure. The differential driver 406 consists of pre-driver circuitry 502 for amplifying and establishing signal timing and the output driver circuitry 504 for transmitting the information over an output node 506.

The pre-driver circuitry 502 is more fully illustrated in FIGS. 6a-6d. A NAND gate 602 has its first and second inputs connected to receive input signals. The output of NAND gate 602 is connected to the input of an inverter 604. The output of inverter 604 is connected to node 606. The output of inverter 604 is also connected to the input of an inverter 608 at node 606. The output of inverter 608 is connected to the gate of inverter 610 at node 612. The output of inverter 604 is also connected to the gates of P-channel transistor 614 and N-channel transistor 616. Transistor 614 has its source/drain path connected between $V_{DD}$ and node 618. Another P-channel transistor 620 has its source/drain path connected between node 618 and node 622. Transistor 616 has its drain/source path connected between node 622 and ground. The output of NAND gate 624 is connected to the input of an inverter 626. The output of inverter 626 is connected to the gate of a transistor 628. The N-channel transistor 628 has its drain/source path connected between node 618 and node 630. NAND gate 632 has its output connected to the input of inverter 634. The output of inverter 634 is connected to the gate of an N-channel transistor 636. The transistor 636 has its drain/source path connected between node 618 and node 638.

Input node 640 is connected to the input of inverter 642. The output of inverter 642 is connected to an input of NAND gate 644. The second input of NAND gate 644 is connected to node 646. An inverter 648 is connected to node 606.

The output of inverter 648 is connected to the gates of transistors 650 and 652. The source/drain path of transistor 650 is connected between $V_{DD}$ and node 654. Transistor 652 has its drain/source path connected between node 654 and ground. Node 654 is connected to the gates of transistor 656 and 658. Transistor 656 has its source/drain path connected between $V_{DD}$ and node 646. Transistor 658 has its drain/source path connected between node 646 and ground. The output of NAND gate 644 is connected to the input of an inverter 660. The output of inverter 660 is connected to the input of a next inverter 662. The output of inverter 662 is connected to a node 664. Node 664 is connected to the input of an inverter 666 whose output is connected to a next inverter 668. The output node 664 is connected to the output of inverter 662 and to a pair of transistors 670 and 672. Transistor 670 has its source/drain path connected between $V_{DD}$ and node 674. N-channel transistor 676 has its drain/source path connected between node 674 and node 678, and transistor 672 has its drain/source path connected between node 678 and ground. A NAND gate 680 has its output connected to a transistor 682. The transistor 682 is connected between node 684 and node 678. A NAND gate 686 has its output connected to a transistor 688. The source/drain path of transistor 688 is connected between node 690 and node 678. The outputs at node 618 and 678 of the pre-driver circuit are connected to the USB output driver circuit illustrated in FIG. 7.

Figure 7:
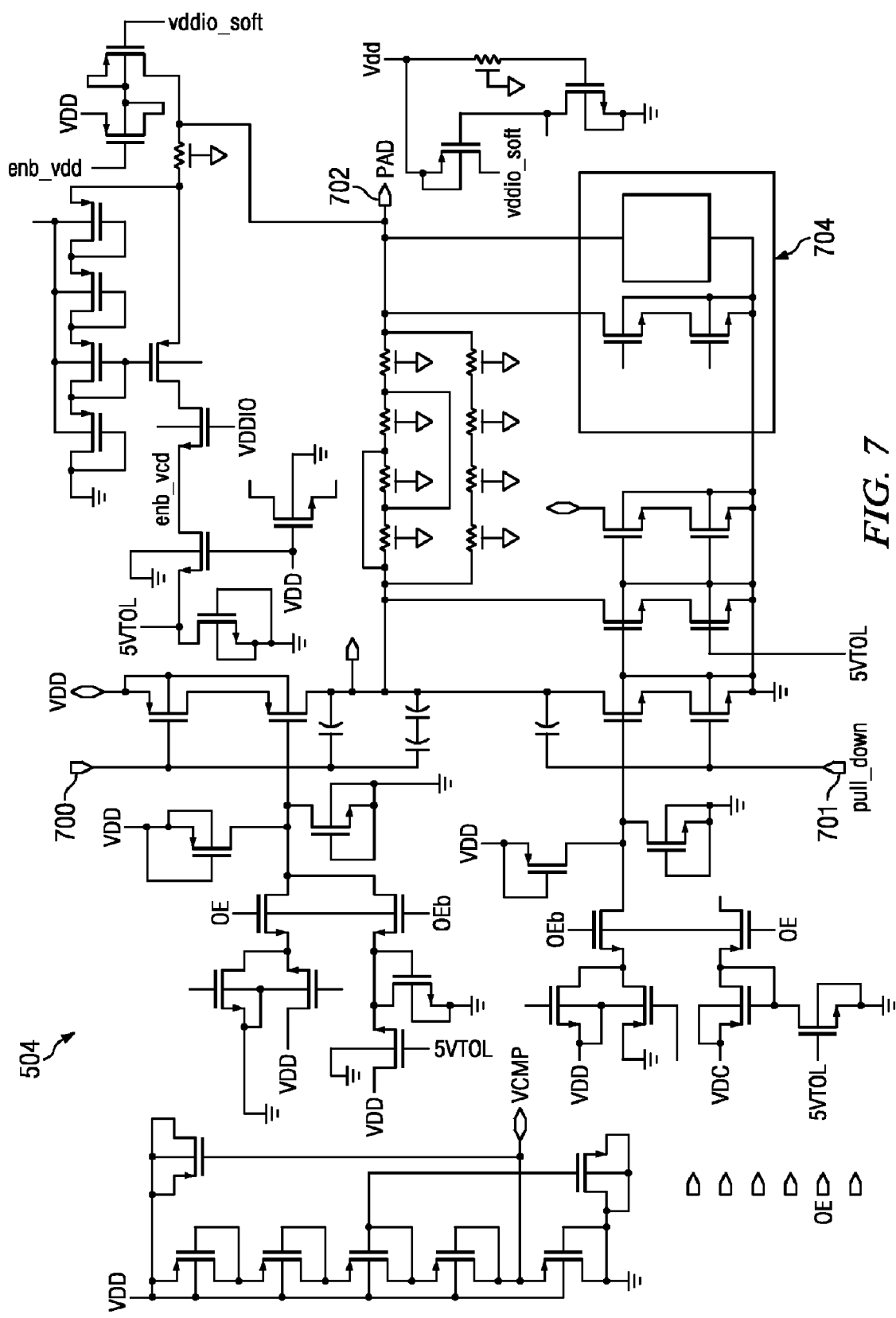
FIG. 7 is a schematic diagram of the universal serial bus output driver.

Referring now to FIG. 7, there is illustrated the schematic diagram of the output driver 504. The input node PULL_UP 700 receives its input from node 618 of the pre-driver circuit 502. The node PULL_DOWN 701 receives its input from node 678 of the pre-driver circuit 502. The output driver would connect to a pad 702 that would provide the D+ or D− USB connection. Depending upon whether the circuitry was associated with driver 406a or 406b of FIG. 4. The driver circuitry includes ESD protection circuitry 704. A simplified version of the driver circuitry is illustrated in FIGS. 8 and 9.

Figure 8:
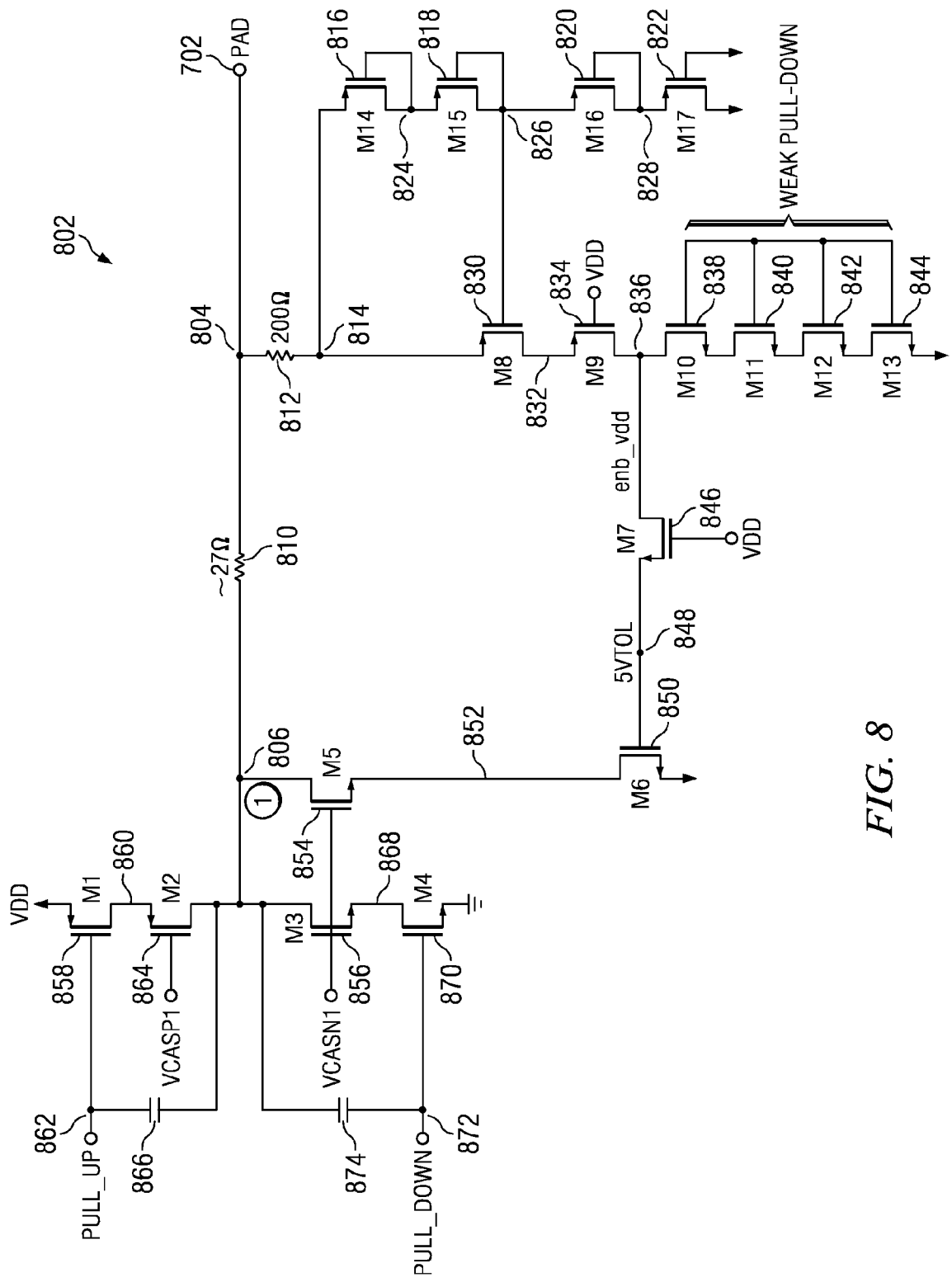
FIG. 8 is a schematic diagram of the 5 volt tolerance protection circuitry incorporated within the USB output driver.
Figure 9:
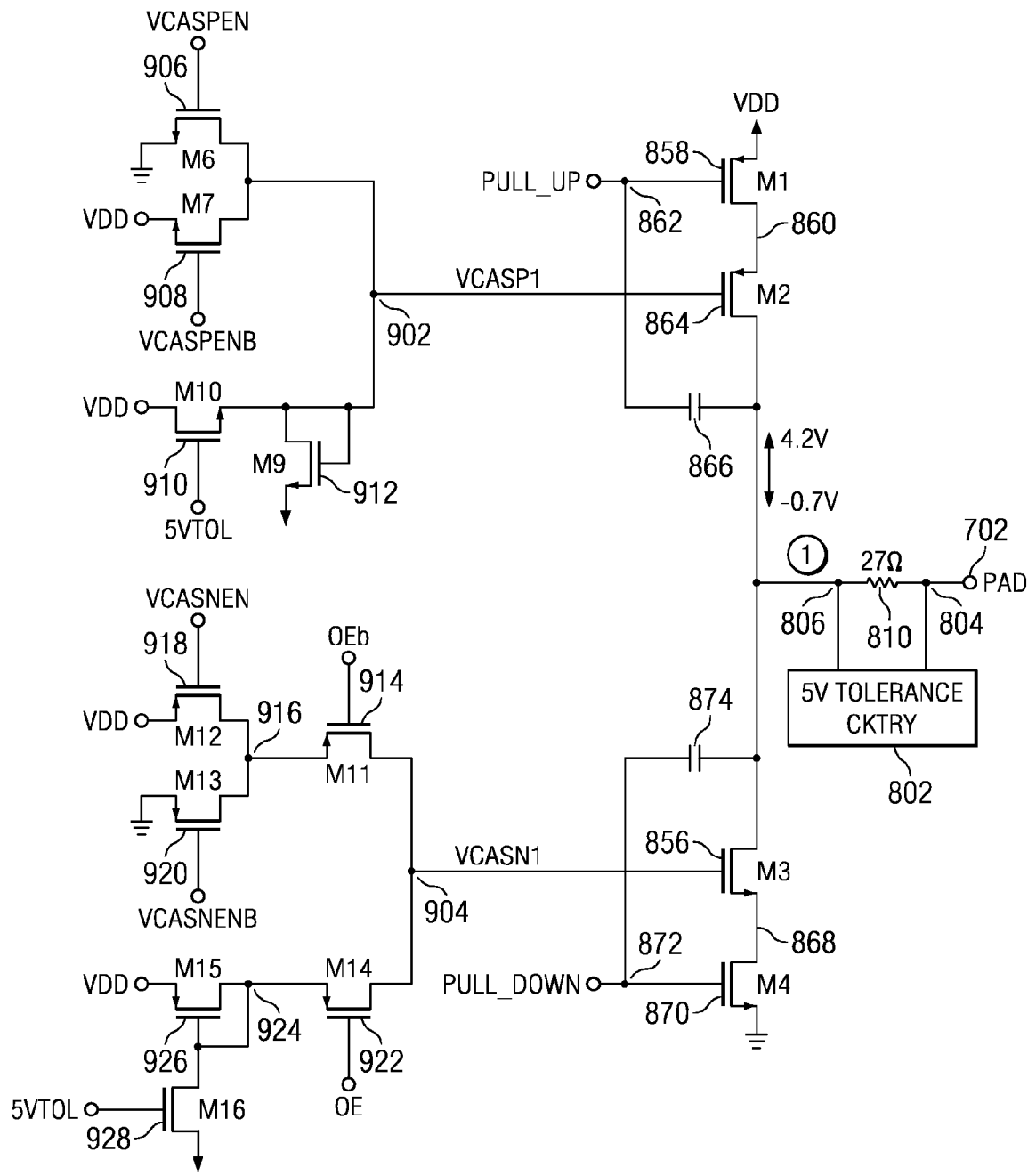
FIG. 9 is a schematic diagram of the cascode voltage generation circuitry within the output driver of the USB output drive.

Referring now to FIG. 8, there is illustrated a simplified version of the output driver circuitry including the 5 volt tolerance protection according to the present disclosure. FIG. 8 illustrates the 5 volt tolerance circuitry 802 that is connected with the pad input 702. Connected with the pad input 702 between node 804 and node 806 is a resistor 810. In a preferred embodiment, the resistor 810 has a value of approximately 27 ohms. Node 806 corresponds to node 410 of FIG. 4 which is connected to the inputs of the receivers 402 and 404 of the USB transceiver. A second resistor 812 having a value of approximately 200 ohms, in one embodiment, is connected between node 804 and 814. Connected to node 814 are a series connection of P-channel transistors 816, 818, 820 and 822. Transistor 816 has its source/drain path connected between node 814 and node 824. The gate of transistor 816 is also connected to node 824. Transistor 818 has its source/drain path connected between node 824 and node 826. The gate of transistor 818 is also connected to node 826. Transistor 820 has its source/drain path connected between node 826 and node 828. The gate of transistor 820 is also connected to node 828. Transistor 822 has its source/drain path connected between node 828 and ground. The gate of transistor 828 is also connected with ground.

P-channel transistor 830 has its source/drain path connected between node 814 and node 832. The gate of transistor 830 is connected to node 826. Another P-channel transistor 834 is connected between node 832 and node 834 labeled ENB_VDD. Connected to node 836 at the drain of transistor 834 are a series connection of four transistors 838, 840, 842 and 844 which act as a weak pull down on node 836. The series connection of the four N-channel transistors 838-844 are connected between node 836 and ground.

An N-channel transistor 846 is connected between node 836 and node 848. The gate of transistor 846 is connected to system power $V_{DD}$. A N-channel transistor 850 has its gate connected to node 848 and its drain/source path connected to node 842 and ground. N-channel transistor 854 has its drain/source path connected between node 806 and node 852. The gate of transistor 854 is connected to the gate of another N-channel transistor 856 which is connected to receive the control signal VCASN1. A P-channel transistor 858 has its source/drain path connected between $V_{DD}$ and node 860. The gate of transistor 858 is connected to node 862 labeled "PULL_UP." A second P-channel transistor 864 has its source/drain path connected between node 860 and node 806. The gate of transistor 864 is connected to signal VCASP1. A capacitor 866 is connected between node 862 and node 806. The N-channel transistor 856 having its gate connected with the gate of N-channel transistor 854 has its drain/source path connected between node 806 and node 868. A transistor 870 has its drain/source path connected between node 868 and ground. The gate of transistor 870 is connected to node 872 labeled "PULL_DOWN." A capacitor 874 is connected between node 872 and node 806.

When the voltage at pad 702 goes to approximately 5 volts, this drives the voltage at node 836 ("ENB_VDD") high. When node 836 is driven high, the voltage at node 848 ("5VTOL") also goes high turning on transistor 850. When transistor 850 is turned on, node 806 is connected to ground and pulled low. Transistor 850 must be sized such that when it is turned on the voltage at node 806 is below 3.6 volts. This enables protection from the voltage applied to the input of the receivers when the pad 702 is shorted. Transistor 830 protects transistor 834 from the voltage at the pad 702. Under worse case corners, the voltage at node 836 ("ENB_VDD") goes high when the pad voltage is above 4.2 volts. This enables protection of the internal transceiver circuitry above this value. Below 4.2 volts, the circuitry is not enabled and thus node 806 will swing from −0.7 volts to 4.2 volts responsive to voltages applied at the pad node 702.

Referring now to FIG. 9, there is illustrated the remainder of the circuitry of the USB driver including the 5 volt tolerance circuitry and other of the circuitry described previously. Connected to the gate of transistor 864 at node 902 ("VCASP1") and at the gate of transistor 856 at node 904 ("VCASN1") is the remainder of the cascade voltage generation circuitry. An N-channel transistor 906 has its drain/source path connected between node 902 and ground. Another N-channel transistor 908 has its drain/source path connected between node 902 and $V_{DD}$. The gate of transistor 906 is connected to the control signal VCASPEN and the gate of transistor 908 is connected to the signal VCASPENB. An N-channel transistor 910 has its source/drain path connected between node 902 and $V_{DD}$. The gate of transistor 910 is connected to node 848 to receive the voltage from the 5 volt TOL node 848. An N-channel transistor 912 has its drain/source path connected between node 902 and ground and has its gate connected to node 902.

Connected to node 904 is a P-channel transistor 914. The drain/source path of transistor 914 is connected between node 904 and node 916. The gate of transistor 914 is connected to the enable control signal OEB. Another P-channel transistor 918 has its drain/source path connected between node 916 and $V_{DD}$. The gate of transistor 918 is connected to the signal VCASNEN. A P-channel transistor 920 has its drain/source path connected between node 916 and ground. The gate of transistor 920 is connected to signal VCASNENB. A P-channel transistor 922 has its drain/source path connected between node 904 and node 924. The gate of transistor 922 is connected to receive the control signal OE. The transistor 926 has its drain/source path connected between node 924 and $V_{DD}$. The gate of transistor 926 is connected to node 924. Also connected to the gate of transistor 926 at node 924 is transistor 928 having its drain/source path connected between node 924 and ground. The gate of transistor 928 is connected to node 848 to receive the voltage from the 5 volt TOL node 848.

Transistors 858, 864, 856 and 870 comprise a cascode output stage. Depending on whether node 806 is connected to $V_{DD}$ via transistor 858 or ground via transistor 870, transistors 854 and 856 will be turned on and off to provide a higher impedance from the view point of node 806. The control of transistor 864 via control signal VCASP1 and the control of transistor 856 via control signal VCASN1 are provided via a number of switches which may connect the gate of the transistors 864 and 856 to either $V_{DD}$, ground or a bias voltage to protect the transistors 858 and 870 from a 5 volt short on the pad 702. In a first mode of operation, the input PULL_UP at node 862 is set to $V_{DD}$ and the input PULL_DOWN at node 872 is set to $V_{DD}$. In this mode, the signal VCASP1 applied to the gate of transistor 864 and the signal VCASN1 applied to gate of transistor 856 must both also be $V_{DD}$. This is achieved by connecting $V_{DD}$ to node 902 through transistor 908 by turning it on. Similarly, $V_{DD}$ is applied to node 904 by turning on transistor 918. In this configuration, transistors 858 and 864 are both turned off and transistors 856 and 870 are both turned on causing node 806 to be pulled to ground. In this case, the pad 702 would be driving an output value of logic "0".

In a second mode of operation, the signal PULL_UP at node 862 is connected to ground. The signal PULL_DOWN at node 872 is set to ground and the signal VCASP1 and VCASN1 are both connected to ground. The signal VCASP1 is connected to ground through transistor 906 and the signal VCASN1 is connected to ground via transistor 920. In this mode, transistors 858 and 864 are both turned on while transistors 856 and 870 are turned off. This connects node 806 to $V_{DD}$. In this case, the pad 702 would be driving an output value of logic "1".

In a third mode of operation when the pad 702 is acting as an input to receive signals, PULL_UP is connected to $V_{DD}$ and VCASP1 is connected to $V_{DD}$. The PULL_DOWN and VCASN1 are both connected to ground. This turns off each of transistors 858, 864, 856 and 870. This open circuits the driver circuitry enabling the pad 702 to be driven by an external device and act as a receiver.

Finally, in a last mode of operation, when the circuit is neither transmitting or receiving, the transistors 858 and 870 may be protected from a 5 volt short circuit in the following manner. The inputs VCASP1 and VCASN1 are both connected with an associated bias voltage. In the case of VACASP1 this comprises a value of $V_{DD}-V_T$ supplied via transistors 910 and 920 to node 902. The input VCASN1 is a voltage equal to $V_T$ provided via transistors 926 and 928. These bias voltages keep both of transistors 864 and 856 turned on and active even though the output driver is disabled. By maintaining transistors 864 and 856 in an "on" state when the output driver is disabled by application of the bias voltages to their gates, the drain/source voltage of both of transistors 858 and 870 will remain below 3.3 volts even if a 5 volt signal is applied to the pad 702. This enables protection of the remaining pad circuitry from a 5 volt short even though the device is turned off. By leaving "on" transistors 864 and 856 via the bias voltage, this enables protection of transistor 858 and 870 from a short.

Figure 10:
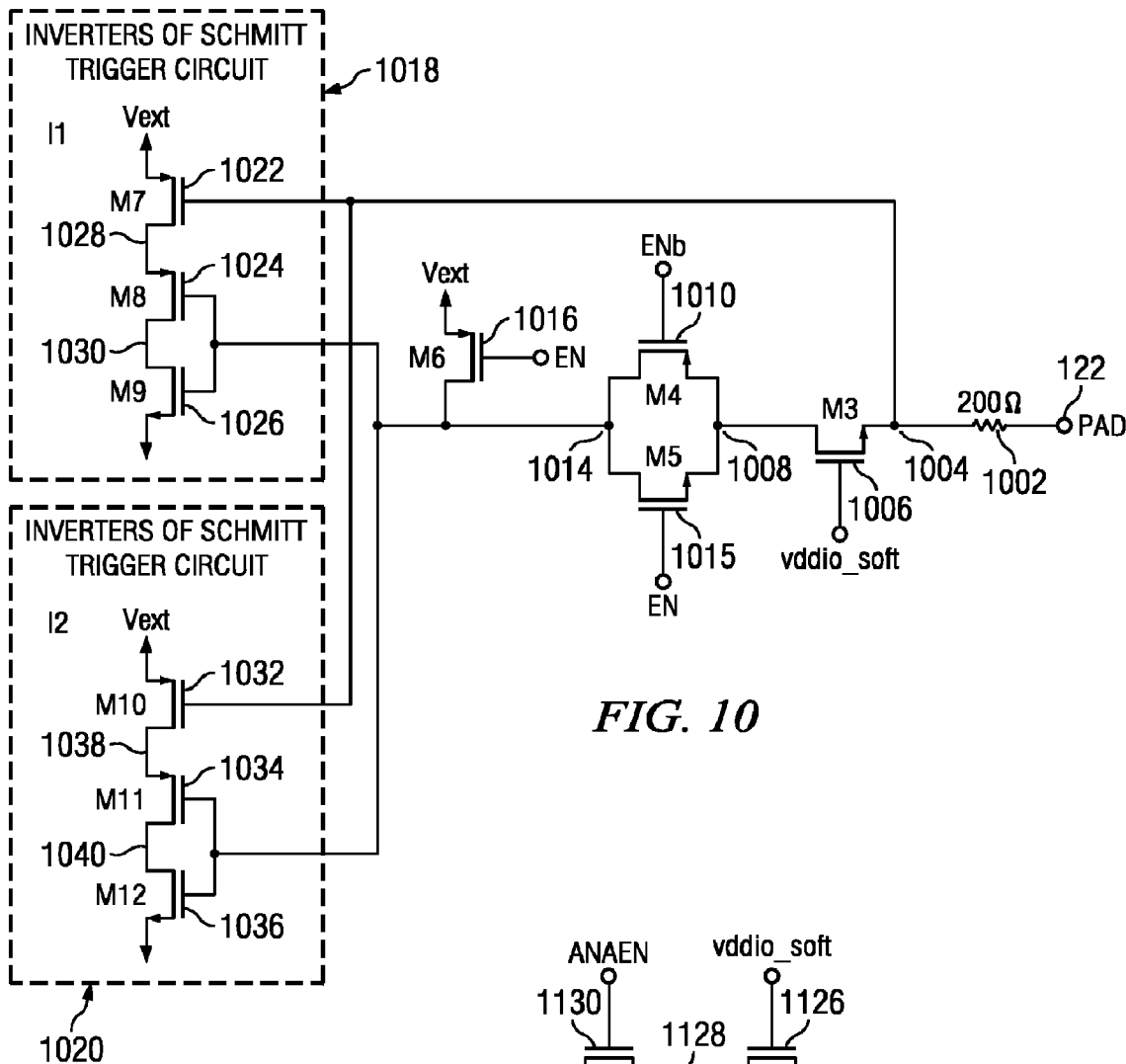
FIG. 10 is a block diagram of a digital I/O pad having 5 volt tolerance protection.
Figure 11:
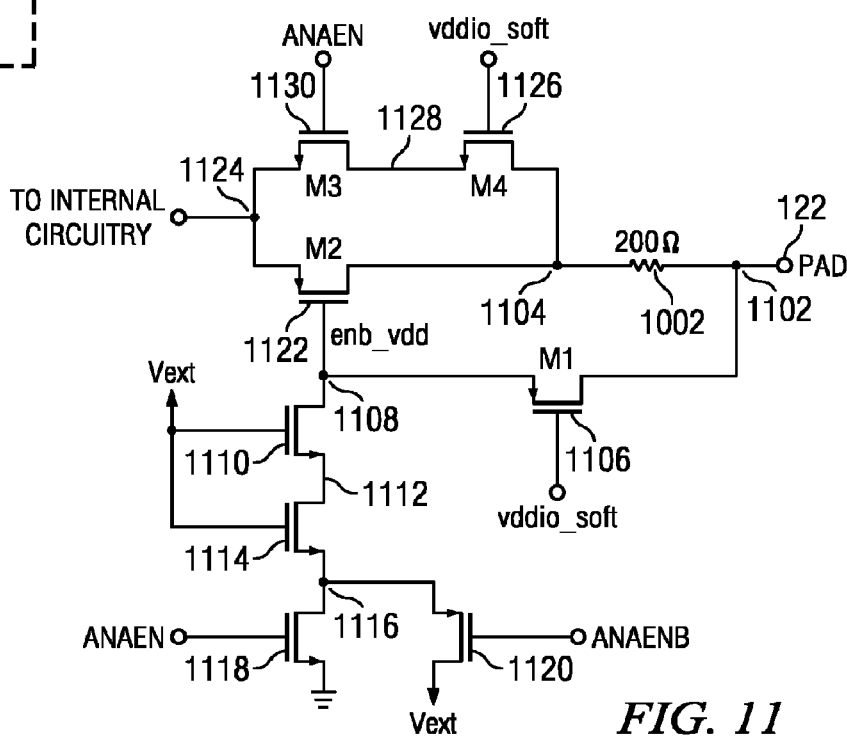
FIG. 11 is a schematic diagram of an analog I/O pad including 5 volt tolerance protection.

An additional group of pins that must be 5 volt short tolerant within the MCU circuitry of FIG. 1 comprise the I/O pins 122. The pins must be protected in a voltage range of 3.6 to 4.5 volts. This is because when a voltage on the I/O pad 122 is in this range as much as 300 microamps of current may be pulled on the MCU 100. The I/O pins 122 may be configured to operate in either a digital or analog mode as described in corresponding U.S. Pat. No. 6,885,219 issued on Apr. 26, 2005, entitled "PROGRAMMABLE DRIVER FOR AN I/O PIN OF AN INTEGRATED CIRCUIT" which is incorporated herein by reference. FIGS. 10 and 11 illustrate the circuitry for protecting the device from a 5 volt short when the input is acting as a digital I/O (FIG. 10) or as an analog I/O (FIG. 11).

Referring now to FIG. 10, a resistor 1002 is connected between the pad 122 and node 1004. An N-channel transistor 1006 has its source/drain path connected between node 1004 and node 1008. A P-channel transistor 1010 is in parallel with an N-channel transistor 1012 between nodes 1008 and 1014. The source/drain path of each transistor is connected from node 1008 to node 1014. A P-channel transistor 1016 has its source/drain path connected between $V_{DD}$ and node 1014. An enable signal is applied to the gates of transistors 1015 and 1016 and a signal ENABLE_B is applied to the gate of transistor 1010. Connected to node 1014 are the inputs of a pair of inverters 1018 and 1020 for Schmidt trigger circuits. The inverter 1018 consists of a series connection of P-channel transistor 1022, P-channel transistor 1024 and N-channel transistor 1026. Transistor 1022 is connected between $V_{DD}$ and node 1028. The gate of transistor 1022 is also connected to node 1004. Transistor 1024 has its source/drain path connected between node 1028 and node 1030. The transistor 1026 has its drain/source path connected between node 1030 and ground. The gates of each of transistors 1024 and 1026 are connected to node 1014.

The second inverter 1020 of the Schmidt trigger circuit also includes a P-channel transistor 1032, a P-channel transistor 1034 and an N-channel transistor 1036. The source/drain path of transistor 1032 is connected between $V_{DD}$ and node 1038. The gate of transistor 1032 is connected to node 1004. Transistor 1034 has its source/drain path connected between node 1038 and node 1040 while the drain/source path of transistor 1036 is connected between node 1040 and ground. The gates of each of transistors 1034 and 1036 are connected to node 1014.

This digital input circuitry is tolerant of voltages all the way up to 5 volts. This is achieved by a configuration which insures that none of the internal transistors see a voltage of more than 3.6 volts. When a 5 volt signal is applied at pad 122 the only transistors which have a 5 volt signal applied thereto are transistors 1022 and 1032 at the gates of the transistors via node 1024. Transistors 1022 and 1032 are protected from a 5 volt short by transistors 1024 and 1034. When the voltage at pad 122 exceeds 5 volts, transistor 1006 will be turned off to protect the inputs to the remainder of the circuitry. In this manner, the digital receive path is protected from a 5 volt short for the pad 122.

Referring now to FIG. 11, there is illustrated the receive path for the I/O pin 122 when the pin is configured as an analog I/O. A resistor 1002 is connected between node 1102 and node 1104. A P-channel transistor 1106 has its drain/source path connected between node 1102 and node 1108, the node "ENB_VDD." An N-channel transistor 1110 is connected between node 1108 and node 1112. The gate of transistor 1110 is connected to $V_{DD}$. An N-channel transistor 1114 has its drain/source path connected between node 1112 and node 1116. The gate of transistor 1114 is also connected to $V_{DD}$. An N-channel transistor 1118 has its drain/source path connected between node 1116 and ground. The gate of transistor 1118 is connected to the signal ANAEN. A P-channel transistor 1120 has its source/drain path connected between node 1116 and $V_{DD}$. The gate of transistor 1120 is connected to the signal ANAENB. The gate of a P-channel transistor 1122 is connected to node 1108. The drain/source path of transistor 1122 is connected between node 1104 and node 1124. An N-channel transistor 1126 has its drain/source path connected between node 1104 and node 1128. The gate of the transistor 1126 is connected to input VDDIO_SOFT. An N-channel transistor 1130 has its drain/source path connected between node 1128 and node 1124. The gate of transistor 1130 is connected to ANAEN. Node 1124 is connected to the remaining internal circuitry of the MCU 100.

The proposed analog input receive path circuit is tolerant up to an input voltage of 5 volts. The control signal ANAEN controls the generation of the voltage at the node ENB_VDD. When the analog mode is disabled, the voltage at node 1108 "ENB_VDD" will charge up to the pad voltage through transistor 1106. This insures that the transistor 1122 is turned off. Since transistor 1122 is turned off and transistor 1130 is also turned off since the analog mode is not enabled, i.e., the signal to the gate of 1130 is low, the internal circuitry past node 1124 does not see the pad voltage and is protected from signals up to 5 volts. When the analog mode is enabled, the receive path is not 5 volt tolerant.

Figure 12:
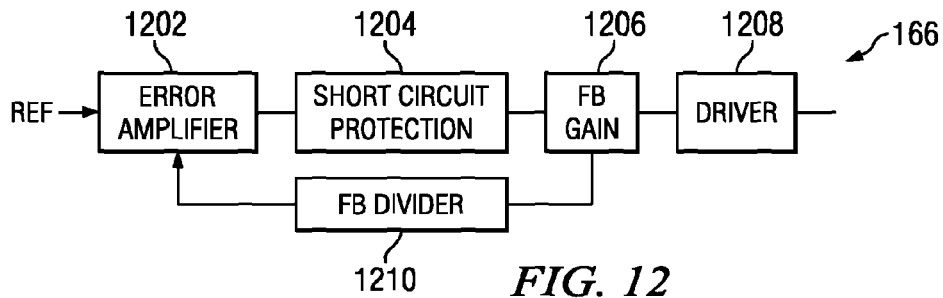
FIG. 12 is a block diagram of the voltage regulator of the microcontroller unit.

Referring now to FIG. 12 there is illustrated a block diagram of the voltage regulator 166. The voltage regulator 166 includes an error amplifier 1202 for determining an error signal. The error amplifier 1202 compares a reference voltage to a feedback signal provided from the feedback gain circuit 1206. Short circuit protection 1204 protects the voltage regulator 166 if a user shorts the VREG pin to ground. Should this happen, the chip will not be damaged. A feedback gain circuit 1206 provides feedback with respect to the output of the voltage regulator and provides this to the error amplifier 1202. The driver 1208 drives the regulated output voltage. The feedback voltage divider circuit 1210 comprises a voltage divider which divides down the 3.3 volt output signal of the voltage regulator so that it can be compared with a 1.2 volt reference signal applied to the error amplifier 1202 by a bandgap generator (not shown).

Figure 13:
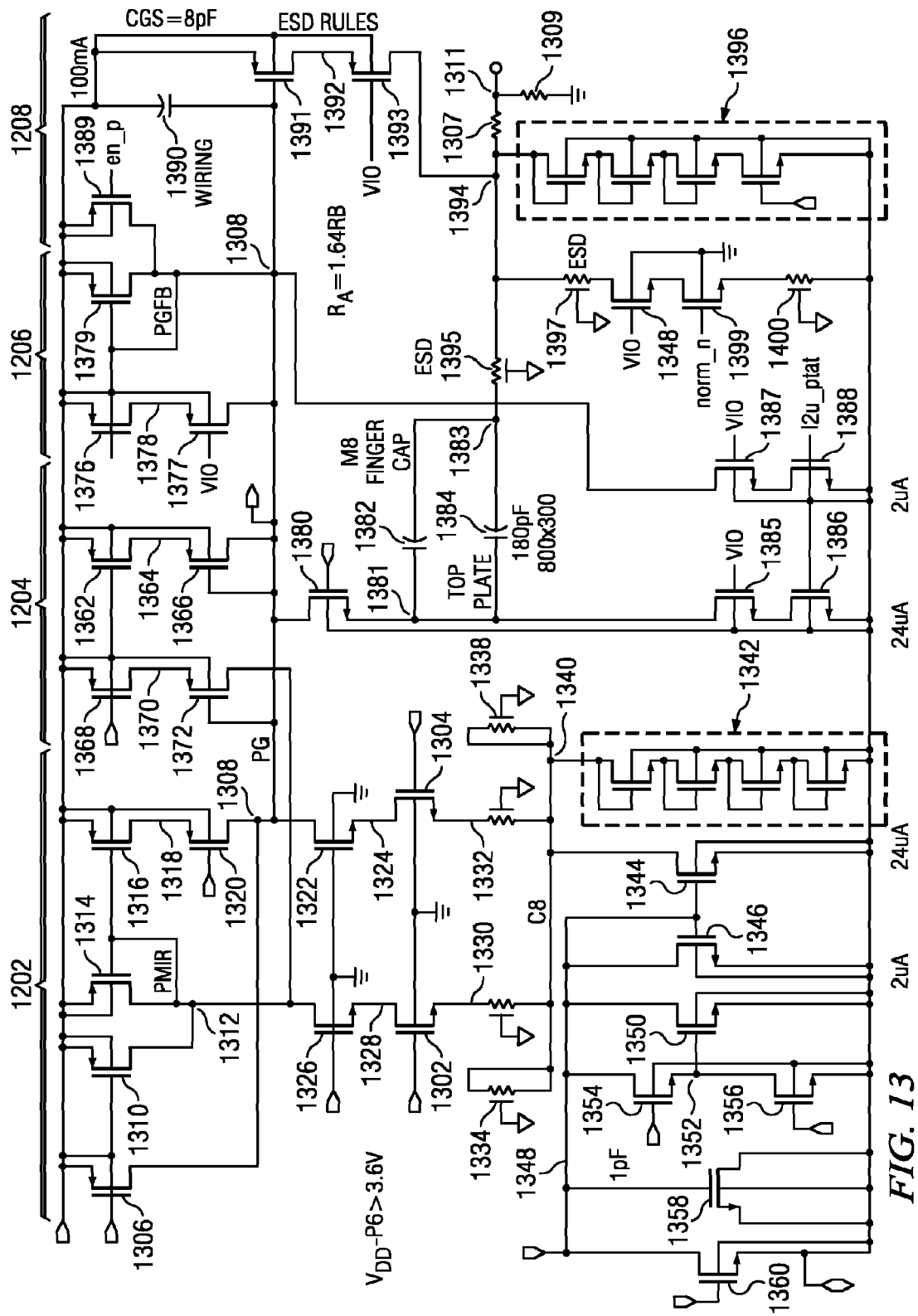
FIG. 13 is a schematic diagram of the regulator circuit including short circuit protection circuitry.

Referring now to FIG. 13, there is more particularly illustrated a schematic diagram of the voltage regulator 166 including the short circuit protection circuitry 1204. The feedback voltage signal is applied to the gate of transistor 1302 while the reference voltage signal is applied to the gate of transistor 1304. The reference voltage is 1.25 volts from a bandgap voltage reference generator (not shown). P-channel transistor 1306 has its source/drain path connected between $V_{DD}$ and node 1308. The gate of transistor 1306 is connected to the gate of transistor 1310. Transistor 1310 is a P-channel transistor having its source/drain path connected between $V_{DD}$ and node 1312. Transistor 1314 is a P-channel transistor having its source/drain path connected between $V_{DD}$ and node 1312. The gate of transistor 1314 is also connected to node 1312 as well as to the gate of transistor 1316. The gate of transistor 1316 is connected between $V_{DD}$ and node 1318. P-channel transistor 1320 is connected between node 1318 and node 1308. The gate of transistor 1320 is connected to signal "VIA." The error amplifier 1202 interconnects with the short circuit protection circuitry 1204 at node 1308.

An N-channel transistor 1322 has its drain/source path connected between node 1308 and node 1324. The gate of transistor 1322 is connected with the gate of transistor 1326. Transistor 1326 has its drain/source path connected between node 1312 and node 1328. Transistor 1302, which is connected to receive the feedback signal, has its drain/source path connected between node 1328 and node 1330. Transistor 1304 has its drain/source path connected between node 1324 and node 1332. A variable resistor array 1334 is connected to the source of transistor 1302 between nodes 1330 and node 1340. A second variable resistor array 1338 is connected to the source of transistor 1334 between node 1332 and node 1340.

Connected between node 1330 and ground are a series connection of N-channel transistors 1342 each having their gate connected to their drain. This transistor stack pulls node 1340 low when the short circuit protection block is disabled. This protects transistor 1344 from a short circuit condition. Transistor 1344 is connected between node 1340 and ground. The gate of transistor 1334 is connected to the gate of transistor 1346 at node 1348. Transistor 1346 has its drain/source path connected between node 1348 and ground. An N-channel transistor 1350 has its drain/source path connected between node 1348 and ground also. The gate of transistor 1350 is connected to node 1352 between transistor 1354 and 1356. Transistor 1354 is an N-channel transistor having its drain/source path between node 1348 and node 1352. Transistor 1356 is an N-channel transistor having its drain/source path between node 1352 and ground. Transistor 1358 has its gate connected to node 1348. The drain and source of transistor 1358 are both connected to ground. Transistor 1360 has its drain/source path connected between node 1348 and ground.

As described previously, the short circuit protection circuitry 1204 is interconnected with the error amplifier 1202 at node 1308. Additionally, the short circuit protection circuitry 1204 interconnects with the feedback gain circuitry 1206 at node 1308. The short circuit protection circuitry consists of two pairs of P-channel transistors connected in parallel between $V_{DD}$ and node 1308. Transistor 1362 has its source/drain path connected between $V_{DD}$ and node 1364. Transistor 1366 has its source/drain path connected between node 1364 and node 1308. Likewise, transistor 1368 has its source/drain path connected between $V_{DD}$ and node 1370 while transistor 1372 has its source/drain path connected between node 1370 and node 1308. The gates of each of transistors 1372 and 1376 are also connected to node 1308.

Transistors 1368 and 1362 have their gate connected to a control signal to enable and disable the short circuit protection circuitry. When the input to the gates of transistors 1368 and 1362 is high, the short circuit protection circuitry 1204 will be enabled. By using two pairs of transistors in parallel rather than just a single pair of transistors within the short circuit protection circuitry 1204, the short circuit protection signal comprises a common mode signal that does not generate an offset in the signal generated by the error amplifier at node 1308. If only a single pair of transistors were used, an offset would be created in the output signal of the error amplifier 1202 causing poor load regulation.

The short circuit protection circuitry 1204 maintains node PG (1308) such that $V_{DD}$ minus the voltage at node PG is less than 3.6 volts. This is necessary to protect the P-channel devices connected to node PG (1308) which would be damaged if the voltage at node PG went above 3.6 volts. The short circuit protection circuitry consisting of transistors 1368, 1372, 1362 and 1366 are all turned on responsive to an enabling signal applied to the gate of transistor 1368. The enabling signal is provided when the gate of transistor 1368 is connected to ground. This turns on each of transistors 1368, 1372, 1362 and 1366. This pulls the node PG (1308) to within 3.6 volts of the rail voltage $V_{DD}$. Thus, when the short circuit protection circuitry is enabled by connecting the gate of transistor 1368 to ground, the node PG (1308) is maintained within 3.6 volts of $V_{DD}$ at all times no matter if the $V_{REG}$ pin is inadvertently shorted to ground or not.

The feedback gain circuitry 1206 and driver 1208 include a P-channel transistor 1376 having its source/drain path connected between $V_{DD}$ and node 1378. A P-channel transistor 1377 has its source/drain path connected between node 1378 and ground. The gate of transistor 1376 is connected with the gate of transistor 1379 which has its source/drain path connected between $V_{DD}$ and node 1308. The gate of transistor 1379 is also connected to node 1308. A transistor 1380 has its drain/source path connected between node 1308 and node 1381. A capacitor 1382 is connected between node 1381 and node 1383. A transistor 1384 is connected in parallel with transistor 1382 between node 1381 and node 1383. A pair of capacitors 1385 and 1386 are connected in series between node 1381 and ground. Another pair of capacitors 1387 and 1388 are connected in series between node 1308 and ground.

The PMOS driver 1208 consists of a transistor 1389 having its source/drain path connected between $V_{DD}$ and node 1308 and its gate connected to receive an enable signal. A capacitor 1390 is also connected between $V_{DD}$ and node 1308. Transistor 1391 has its source/drain path connected between $V_{DD}$ and node 1392. The gate of transistor 1391 is connected to node 1308. Transistor 1393 has its source/drain path connected between node 1392 and node 1394. The feedback from node 1394 is provided to the gate of transistor 1306 of the error amplifier 1202. Thus, the 3.3 volt $V_{REG}$ signal provided from the output of the voltage regulator is divided down to 1.25 volts by the feedback divider circuit 1210 consisting of a pair of resistors 1307 and 1309 and is then compared with the reference voltage provided to the gate of transistor 1304 by the band gap voltage generator. An ESD resistor 1395 is connected between node 1383 and node 1394. A series of transistors 1396 act as a pull down and pull the regulated voltage to ground if the REGIN equals 5 volts and the voltage regulation is disabled. ESD resistor 1397 is connected to the drain of transistor 1398. The source of transistor 1398 is connected to the drain of transistor 1399 and the source of transistor 1399 is connected to a variable resistor 1400 which is then connected to ground.

Figure 14:
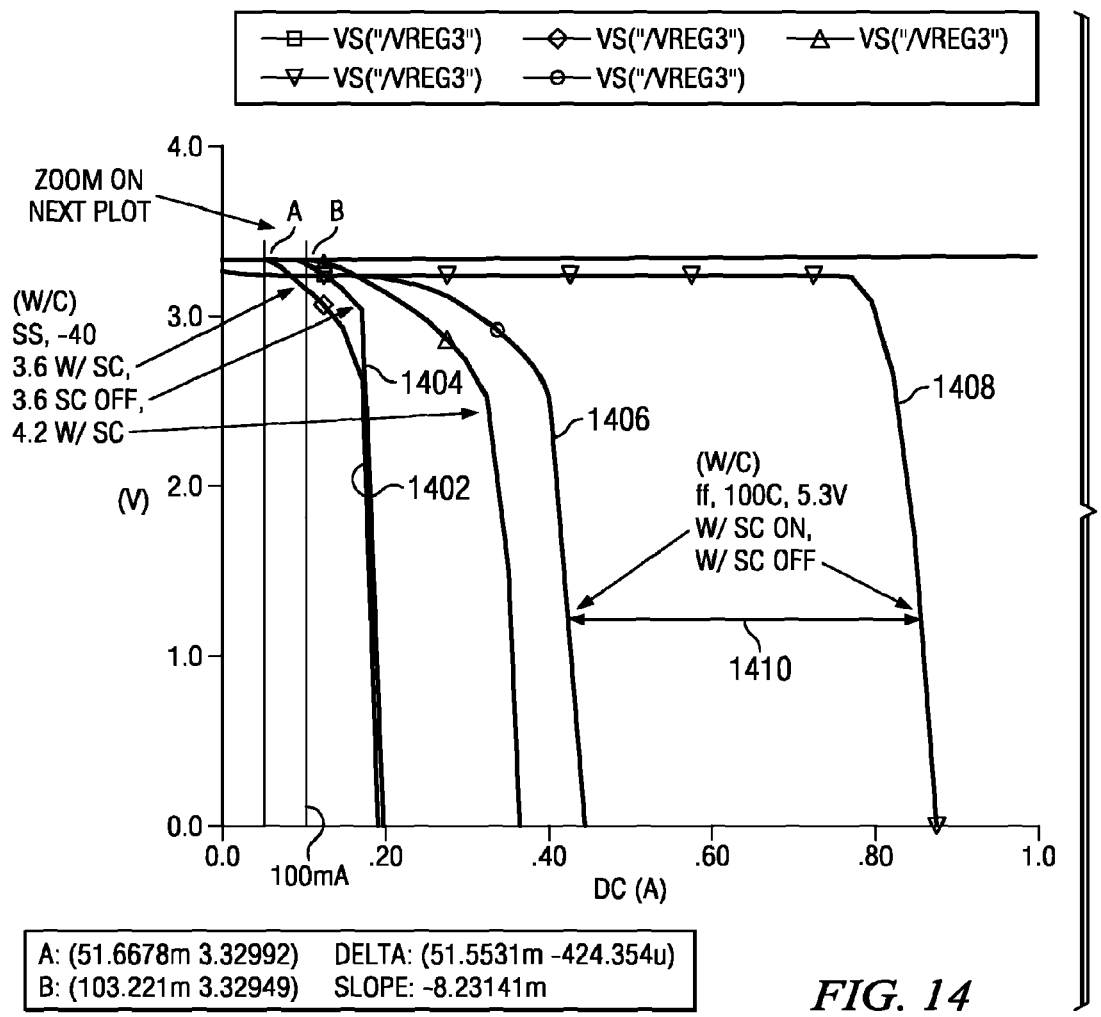
FIG. 14 illustrates the improvement in operation of the voltage regulator when provided with short circuit protection circuitry as illustrated in the voltage regulator of FIG. 13.

Referring now to FIG. 14, there is illustrated the regulated voltage versus the current from the voltage regulator to illustrate the short circuit behavior of the voltage regulator. Lines 1402 and 1404 illustrate the regulated voltage versus the current when the applied voltage is 3.6 volts. As can be seen, there is no great difference in the current behavior of the voltage regulator between the short circuit protection mode and the non-short circuit protection mode since the regulator is already configured to operate within the 3.6 volt range. However, referring now to lines 1406 and 1408, there can be seen a significant difference when turning on the short circuit protection circuitry of FIG. 13 for a 5.2 volt signal. Line 1406 illustrates the current when the short circuit protection circuitry is turned off. As can be seen, the current goes out past 0.8 amps. When the short circuit protection circuitry is turned on while applying a 5.3 volt signal to the VREG pin, the current only goes to slightly above 0.4 amps. Thus, it can be seen that for a 5.3 volt signal the short circuit protection circuitry limits the current to the voltage regulator by approximately 50% as illustrated generally at 1410. It can thus be seen that the use of the short circuit protection circuitry within the voltage regulator greatly reduces the short circuit current within the regulator and provides significant protection to the circuitry of the voltage regulator in a short circuit condition.

It will be appreciated by those skilled in the art having the benefit of this disclosure that this USB transceiver circuitry including 5 volt tolerance protection for a USB transceiver. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A microcontroller unit, comprising:
 a processing core;
 a USB interface for providing USB communications between the microcontroller unit and an external USB device and having an operating voltage below 5V;
 USB transceiver circuitry for transmitting data to/from the microcontroller unit, wherein the USB transceiver circuitry provides protection to the USB interface against a 5V short circuit, wherein the transceiver circuitry further comprises:
  at least one receiver connected to an output pin of the USB interface;
  at least one driver providing an output on a driver output node connected to the output pin of the USB interface;
  voltage tolerance circuitry within the at least one driver for pulling the driver output node low with an active pull down circuit to protect output driving circuitry of the at least one driver responsive to the 5V short circuit on the output pin to protect against the 5V short circuit; and
  a USB controller for controlling operations of the USB transceiver circuitry responsive to instructions from the processing core.

2. The microcontroller unit of claim 1, wherein the USB transceiver circuitry further includes cascode voltage generation circuitry for protecting internal circuitry of the USB transceiver circuitry from the 5V short circuit in a power down mode of operation.

3. The microcontroller unit of claim 2, wherein the cascode voltage generation circuitry includes:
 a pair of transistors for protecting the internal circuitry;
 cascode switching circuitry for providing bias voltages to each of the pair of transistors in the power down mode of operation; and
 wherein the bias voltages maintain the pair of transistors in an on state.

4. The microcontroller unit of claim 3, wherein the cascode switching circuitry further connects the operating voltage or a ground voltage GND to each of the pair of transistors.

5. The microcontroller unit of claim 3, wherein at least one of the pair of transistors is sized to such that a voltage level at the driver output node is below a predetermined level.

6. The microcontroller unit of claim 1, wherein the voltage tolerance circuitry further includes a transistor entering a first state to pull the driver output node toward ground responsive to the 5V short circuit on the output pin.

7. An integrated circuit, comprising:
 a USB interface for interconnecting the integrated circuit and an external USB device and having an operating voltage below 5V;
 USB transceiver circuitry for transmitting data to/from the integrated circuit over the USB interface, wherein the USB transceiver circuitry provides protection to internal circuitry from a 5V short circuit on the USB interface, wherein the transceiver circuitry further comprises:
  at least one receiver connected to an output pin of the USB interface;
  at least one driver providing an output on a driver output node connected to the output pin of the USB interface;
  voltage tolerance circuitry within the at least one driver for pulling the driver output node low with an active pull down circuit to protect output driving circuitry of the at least one driver responsive to the 5V short circuit on the output pin to protect against the 5V short circuit;
  cascode voltage generation circuitry for protecting internal circuitry of the USB transceiver circuitry from a 5V short circuit in a power down mode of operation; and
  a USB controller for controlling operations of the USB transceiver circuitry.

8. The integrated circuit of claim 7, wherein the cascode voltage generation circuitry includes:
 a pair of transistors for protecting the internal circuitry;
 cascode switching circuitry for providing bias voltages to each of the pair of transistors in the power down mode of operation; and
 wherein the bias voltages maintain the pair of transistors in an on state.

9. The integrated circuit of claim 8, wherein the cascode switching circuitry further connects the operating voltage or a ground voltage GND to each of the pair of transistors.

10. The integrated circuit of claim 7, wherein the voltage tolerance circuitry further includes a transistor entering a first state to pull the driver output node toward ground responsive to the 5V short circuit on the output pin.

11. The integrated circuit of claim 10, wherein the transistor is sized to such that a voltage level at the driver output node is below a predetermined level.

12. An integrated circuit, comprising:
 a USB interface for interconnecting the integrated circuit and an external USB device and having an operating voltage below 5V;
 USB transceiver circuitry for transmitting data to/from the integrated circuit over the USB interface, wherein the transceiver circuitry further comprises:
  at least one receiver connected to an output pin of the USB interface;
  at least one driver providing an output on a driver output node connected to the output pin of the USB interface;
  voltage tolerance circuitry within the at least one driver for pulling the driver output node low with an active pull down circuit to protect output driving circuitry of the at least one driver responsive to a 5V short circuit on the output pin; and
  a USB controller for controlling operations of the USB transceiver circuitry.

13. The integrated circuit of claim 12, wherein the USB transceiver circuitry further includes cascode voltage generation circuitry for protecting internal circuitry of the USB transceiver circuitry from a 5V short circuit in a power down mode of operation.

14. The integrated circuit of claim 13, wherein the cascode voltage generation circuitry includes:
a pair of transistors for protecting the internal circuitry;
cascode switching circuitry for providing bias voltages to each of the pair of transistors in the power down mode of operation; and
wherein the bias voltages maintain the pair of transistors in an on state.

15. The integrated circuit of claim 14, wherein the cascode switching circuitry further connects the operating voltage or a ground voltage GND to each of the pair of transistors.

16. The integrated circuit of claim 12, wherein the voltage tolerance circuitry further includes a transistor entering a first state to pull the driver output node toward ground responsive to the 5V short circuit on the output pin.

17. The integrated circuit of claim 16, wherein the transistor is sized to such that a voltage level at the driver output node is below a predetermined level.

\* \* \* \* \*